US009523033B2

(12) United States Patent
Muthe et al.

(10) Patent No.: US 9,523,033 B2
(45) Date of Patent: Dec. 20, 2016

(54) METHOD FOR LARGE SCALE SYNTHESIS OF OPTICALLY STIMULATED LUMINESCENCE GRADE POLYCRYSTALLINE CERAMIC MATERIAL

(71) Applicant: THE SECRETARY, DEPARTMENT OF ATOMIC ENERGY, Mumbai (IN)

(72) Inventors: Kunal Purnachandra Muthe, Mumbai (IN); Mukund Shrinivas Kulkarni, Mumbai (IN); Anuj Soni, Mumbai (IN); Ajay Singh, Mumbai (IN); Narender Singh Rawat, Mumbai (IN); Devesh Ramdhar Mishra, Mumbai (IN); Ratna Pradeep, Mumbai (IN); Shovit Bhattacharya, Mumbai (IN); Deva Nand Sharma, Mumbai (IN); Shiv Kumar Gupta, Mumbai (IN)

(73) Assignee: THE SECRETARY, DEPARTMENT OF ATOMIC ENERGY, Mumbai, Maharashtra (IN)

( * ) Notice: Subject to any disclaimer, the term of this patent is extended or adjusted under 35 U.S.C. 154(b) by 671 days.

(21) Appl. No.: 13/925,809

(22) Filed: Jun. 24, 2013

(65) Prior Publication Data
US 2014/0209712 A1 Jul. 31, 2014

(30) Foreign Application Priority Data
Jan. 29, 2013 (IN) ............................ 252/MUM/2013

(51) Int. Cl.
C09K 11/65 (2006.01)
C04B 35/01 (2006.01)
(Continued)

(52) U.S. Cl.
CPC ........... *C09K 11/655* (2013.01); *C04B 35/013* (2013.01); *C04B 35/44* (2013.01); *C04B 35/653* (2013.01);
(Continued)

(58) Field of Classification Search
CPC ..... C09K 11/655; B02C 19/00; B02C 19/0056
See application file for complete search history.

(56) References Cited

U.S. PATENT DOCUMENTS 7,138,074 B1 * 11/2006 Nakamura ............. 252/301.4 F
2003/0218151 A1 * 11/2003 Akselrod ................ 252/301.4 R
2008/0142731 A1 * 6/2008 Kim et al. ................. 250/484.3

OTHER PUBLICATIONS

Muthe et al., "Melt processing of alumina in graphite ambient for dosimetric applications", Journal of Luminescence vol. 128, Issue 3, Mar. 2008, pp. 445-450.*

* cited by examiner

Primary Examiner — Marcus Taningco
(74) Attorney, Agent, or Firm — Neifeld IP Law, PC

(57) ABSTRACT

A method for the synthesis of OSL grade polycrystalline mass of ceramic materials with dopant C involving source ceramic material preferably in its readily available powder form comprising the steps of melting of the said ceramic material in graphite environment including a graphite crucible/container in vacuum; and obtaining there from polycrystalline aggregate by rapid solidification of said melt to thereby provide said polycrystalline mass of ceramic materials with dopant C of optically stimulated luminescence grade. The said powder form of the ceramic material is compacted and formed into pellets before subjecting to melting.

8 Claims, 8 Drawing Sheets

(51) Int. Cl.
*C04B 35/44* (2006.01)
*C04B 35/653* (2006.01)
(52) U.S. Cl.
CPC .. *C04B 2235/3225* (2013.01); *C04B 2235/422* (2013.01); *C04B 2235/604* (2013.01); *C04B 2235/6562* (2013.01); *C04B 2235/6565* (2013.01); *C04B 2235/6581* (2013.01); *C04B 2235/764* (2013.01)

METHOD FOR LARGE SCALE SYNTHESIS OF OPTICALLY STIMULATED LUMINESCENCE GRADE POLYCRYSTALLINE CERAMIC MATERIAL

CROSS REFERENCE TO RELATED APPLICATIONS

This application claims priority to India Application No. 252/MUM/2013, filed Jan. 29, 2013. The above-referenced application is incorporated by reference in its entirety.

FIELD OF THE INVENTION

The present invention is directed to provide a method for the synthesis of luminescent material having pre-existing luminescence centers and traps, more particularly, the present invention recites a method to facilitate the large scale synthesis of dosimetric grade oxide related systems such as polycrystalline $Al_2O_3$:C involving simplified equipments and inexpensive feed material like $Al_2O_3$ powder or in the form of sintered pellets as a raw material. The production method of the present invention advantageously avoids the usual complex and expensive crystal growth routine for the production of such dosimetric grade oxide related material. The proposed method of the present invention is a straightforward and therefore an effective and economical approach for the large scale synthesis of dosimetric grade oxide related systems for uses including but not limited to personnel dosimeters, environmental dosimeters and high dose dosimeters.

BACKGROUND ART

Presently $Al_2O_3$:C phosphor has acquired the status of an acclaimed phosphor for optically stimulated luminescence based radiation dosimetry and is being extensively used in different radiation dosimetry related applications. The established approach for the large scale production of such dosimetric grade Al2O3:C is based on single crystal growth of $Al_2O_3$ from its molten state carried out in a strongly reducing environment of graphite i.e. carbon by means of Czochralski technique. The feed material for this process is corundum (Alumina) crystal grown from alumina powder by another process of crystal growth called Verneuil method. The said method for synthesis of $Al_2O_3$:C thus involves two stages. In the stage one alumina crystals are grown by Verneuil method and the stage two in which these alumina crystals are again re-melted and subjected to Czochralski technique of crystal growth in the reducing environment of graphite to finally yield $Al_2O_3$:C. Each one of them demands a different type of equipments.

In Czochralski technique, the crystals are grown by inserting a small seed $Al_2O_3$ crystal of an appropriate orientation mounted on the tip of a rotating shaft into a crucible containing molten alumina. The shaft rotates in counterclockwise direction and the crucible which contains molten alumina rotates in clockwise direction. The shaft is slowly lowered into the crucible until it just touches the surface of the molten alumina then the shaft along with the seed is slowly withdrawn from the melt in a vertically upward direction. This seed being at a relatively lower temperature, allows the melt to solidify on it. Since the seed itself being a crystal, wherein the material exists in a highly ordered form, the material which gets subsequently accumulated on this seed too solidifies in the form of a crystal, provided the rate of cooling is slow enough. The slow cooling rates are achieved by a very gradual and controlled withdrawal of seed from the melt. Thus, this approach towards synthesis of dosimetric grade $Al_2O_3$:C material essentially involves high precision and therefore an inherently costly equipments and associated overheads.

Another factor that contributes to the overheads is the cost of pre-processing of raw material alumina powder into corundum (Alumina) crystals grown by Verneuil method to yield the feed material on which this Czochralski technique relies upon and amounts to an additional contribution to the overheads.

Most importantly, the Czochralski technique suffers from a major disadvantage in that the composition of a crystal so grown does not remain constant along the direction of its growth. Besides this, segregation of the dopants is another known disadvantage of this technique. As dosimetric performance of a material critically depends on nature, concentration and uniformity in the distribution of defects the drawbacks of Czochralski method mentioned earlier result into undesirable variations in dosimetric behavior of crystals even though their growth conditions differ only marginally, Moreover, even the samples that are cut out from different regions of the very same single crystal too are known to exhibit (undesirable) deviations in their dosimetric performances.

K. P. Muthe et al., Journal of Luminescence 128 (2008) 445-450, provides a process for the preparation of said dosimetric grade $Al_2O_3$:C from polycrystalline alumina powder without involving the Czochralski technique. Thus the synthesis technique as disclosed in this literature, advantageously avoids the limitation relating to the Czochralski method by introducing a simple carbon-doped alumina samples preparation process involving melting of polycrystalline alumina powder in graphite environment. However the synthesis technique has some inherent limitation which limits its relevance in the large scale synthesis of dosimetric grade $Al_2O_3$:C, such as, the low dosimetric efficiency reported in the said literature (0.65 times of that commercially available reference α-Al2O3:C crystal) due to inadequate concentration and inconsistent distribution of dosimetrically relevant defects. The result that OSL efficiency of even the best samples produced using the method reported in the said literature was only 0.5 times of the commercially available reference $Al_2O_3$:C material produced using the usual crystal growth route can be interpreted to imply that this method cannot produce dosimetrically useful defects in sufficient concentration and/or the distribution of defects produced through this method is non-uniform.

U.S. Pat. No. 6,414,324 teaches a method of preparing a luminescent detecting material such as anion-deficient $Al_2O_3$ for use in UV dosimetry which utilizes photo transferred luminescence wherein the detecting material has a set of shallow dosimetry traps for trapping electronic charge carriers, which are thermally released upon heating to a first temperature, and a set of deep traps for trapping electronic charge carriers, which charge carriers are released upon heating to a second temperature. The detecting material is prepared by irradiating the detecting material to fill the shallow and deep traps with charge carriers, heating the material to release charge carriers from the shallow traps, and then cooling the material.

U.S. Pat. No. 6,811,607 provides aluminum oxide crystalline materials including dopants and oxygen vacancy defects and methods of making such crystalline materials. The crystalline material of the present invention has particular utility in optical data storage applications.

Both these above said US arts rely on the usual method of crystal growth which has inherent limitation as discussed in the previous.

Thus, based on the aforesaid discussions and interpretations of the available experimental observations it is apparent that there has been a need for the development of a process routine adapted to synthesis large scale of dosimetric grade $Al_2O_3$ without involving any high precision and therefore an inherently costly instrumentation and expensive feed material. More particularly, the new method should be a straightforward process to synthesize a polycrystalline material with sufficient grain size adapted to serve as acceptable dosimetric material in radiation dosimetry applications wherein the expensive approach based on lengthy single crystal growth is indeed not necessary.

OBJECT OF THE INVENTION

Thus it the basic object of the present invention is to develop a method for synthesis on large scale of luminescent material having pre-existing luminescence centers.

Another important object of the present invention is to provide a simplified, straightforward and therefore an effective and economical process for synthesis of dosimetric oxide related systems such as dosimetric grade polycrystalline $Al_2O_3$:C by involving simplified process together with readily available feed material like $Al_2O_3$ powder in the form of sintered pellets as a raw material.

Another object of the present invention is to provide a process flow adapted to large scale synthesis of dosimetric grade $Al_2O_3$:C in the form of a fused polycrystalline mass involving alumina powder preferably in the form of sintered pellets in graphite ambience, which acts as a source of carbon doping, and avoiding the complex and elaborate process of grown crystal back to powder form.

Another important object of the present invention is to provide a simplified, straightforward and therefore an effective and economical process for the large scale synthesis of the polycrystalline mass of ceramic materials with dopant C such as $Al_2O_3$, Yttrium Aluminum Garnet (YAG).

Another object of the present invention is to synthesize a dosimetrically sensitive material having effectively distributed 'traps' and 'recombination centers'.

SUMMARY OF THE INVENTION

The basic aspect of the present invention is thus directed to a method for the synthesis of OSL grade polycrystalline mass of ceramic materials with dopant C comprising steps
    involving source ceramic material preferably in its readily available powder form; melting said ceramic material in graphite environment including a graphite crucible/container in vacuum;
    and obtaining therefrom polycrystalline aggregate by rapid solidification of said melt to thereby provide for said polycrystalline mass of ceramic materials with dopant C of optically stimulated luminescence grade.

A further aspect of the present invention is directed to provide a method for the synthesis of polycrystalline mass of ceramic materials with dopant C involving powder form of the ceramic material and the said powder is compacted and formed into pellets before subjecting to melting followed by obtaining there from polycrystalline aggregate comprising (i) compacting the said powder form of the ceramic material to pellets, (ii) sintering the pellets via thermal treatment, (iii) degassing of said graphite crucible/container and loading the said sintered pellets therein and thereafter (iv) melting the pellets and finally (v) obtaining therefrom polycrystalline aggregate by rapid solidification of said melt.

A further aspect in the present invention, the method for the synthesis of polycrystalline mass of ceramic materials with dopant C wherein said polycrystalline aggregate obtained is subjected to pulverization to appropriate particle size and preferably followed by annealing to stabilize the desired sensitivity.

According to another aspect in the method for the synthesis of polycrystalline mass of ceramic materials with dopant C, the said method comprising step of controlling the desired optically stimulated luminescence grade by controlling process parameters including temperature in the range of 1800 to 2100° C. preferably about 2080° C., duration at high temperature 5 to 40 min preferably about 30 min and cooling rates 100 to 200° C./min preferably about 150° C./min According to another aspect in the method for the synthesis of polycrystalline mass of ceramic materials with dopant C, the said source ceramic material comprises $Al_2O_3$ powder and said process steps include:
Compaction of $Al_2O_3$ powder to pellets;
Sintering of $Al_2O_3$ pellets via thermal treatment;
Degassing of graphite crucible in melting furnace by heating to temperatures 1800° C.-2100° C. under vacuum of 500 mTorr to $10^{-4}$ Torr followed by natural cooling to room temperature;
Venting furnace to atmospheric pressure by introduction of inert gases;
Loading of vertical stacks of sintered pellets weighing 50 g to 200 g in degassed graphite crucible followed by evacuation upto vacuum of $10^{-4}$ Torr to $10^{-6}$ Torr.
Subjecting the stacks to vacuum melt processing at temperatures around its melting point in inert atmosphere for formation of $Al_2O_3$:C;
Solidification of the above molten mass by rapid cooling to room temperature;
Venting of furnace to atmospheric pressure by introduction of inert gases;
Pulverization of solidified charge to appropriate particle size;
Annealing of pulverized powder to remove strains during pulverization as well as to stabilize its sensitivity.

A further aspect in the said method, the pellets are sintered in a resistively heated furnace and subjected to thermal treatment in the temperature range of 1000-1500° C. for durations 1-50 hrs using heating and cooling rates in the range 60° C./hr to 400° C./hr in the ambient of $N_2$ or Ar or normal atmosphere.

A still further aspect in the said method, the melt processing of ceramic material alumina is performed at the temperature around its melting point, preferably the processing is done at about 1600-2100° C. for periods ranging from 10 to 30 minutes and for growth of polycrystalline $Al_2O_3$ with oxygen vacancy defects, processing is done in a highly reducing atmosphere in the presence of graphite with the purpose of obtaining low partial pressure of oxygen.

According to another aspect in the said method, the rapid cooling of the melted mass is performed by cooling the mass to 1000° C. over a period of 20-180 min and then to room temperature over a period of about 5 hrs.

In accordance to another aspect in the said method, the heating methodology used for melting the sintered pellet is adapted to provide localized heat to form the molten zone sufficient enough to accomplish the said large scale production.

According to another aspect in the method, the graphite crucible is degassed before executing the melting operation inside the crucible to ensure the presence of high level vacuum, preferably in the range of $10^{-6}$ torr, is attained in melting zone so that induction of oxygen related vacancy defects becomes possible.

According to yet another aspect in the method, the solidified mass pulverized to a powder of particle size preferably in the range 75 to 105 μm and powder was subjected to a stabilizing annealing treatment at 500-900° C. for duration of about 30 minutes.

According to yet another aspect in the method, the ceramic material involved include $Al_2O_3$, Yttrium Aluminum Garnet (YAG), preferably $Al_2O_3$.

BRIEF DESCRIPTION OF THE ACCOMPANYING FIGURES

DETAILED DESCRIPTION OF THE INVENTION WITH REFERENCE TO THE ACCOMPANYING FIGURES

The present invention relates to a method for large scale synthesis of luminescent material having pre-existing luminescence centers for uses, including but not limited to personnel dosimeters, environmental dosimeters, space dosimeters and high dose dosimeters through optically stimulated luminescence. More specifically, the present invention is designated to provide a simplified, straightforward and therefore an effective and economical process for synthesis of dosimetric grade oxide related systems such as dosimetric grade polycrystalline $Al_2O_3$ by involving simplified instrument together with an inexpensive feed material like $Al_2O_3$ powder or in the form of pre-sintered pellets as a raw material. The invention is also capable of carrying out large scale synthesis of the dosimetric grade $Al_2O_3$ related systems like Yttrium Aluminum Garnet (YAG).

The process flow of the present invention is particularly developed to achieve large scale synthesis of dosimetric grade polycrystalline mass of ceramic materials such as $Al_2O_3$, $Y_3Al_5O_{12}$, etc. and like and dopant C involving source ceramic material preferably its readily available powder form, including the steps of, heating the material to above its melting point in the presence of vacuum, graphite and inert gases including $N_2$, Ar, and their combinations etc., and solidifying the melted material to form a polycrystalline mass followed by pulverization of the polycrystalline aggregate to appropriate particle size and preferably followed by annealing process to stabilize desired sensitivity, the improvement comprising introducing said ceramic material to graphite crucible in the form of a plurality of vertically stacked pre-sintered pellets and solidifying said ceramic material in the presence of an inert gas as well as vacuum and thereby induce dosimetric properties into the said material.

A preferred process embodiment of the present invention advantageously involves large scale synthesis of dosimetric grade $Al_2O_3$:C in the form of a fused polycrystalline mass by vacuum melting of readily available alumina powder in the form of sintered pellets in graphite ambience, preferably the said melting process executed in a properly degassed graphite crucible which acts as a source of carbon doping and subjecting the melted mass to a rapid cooling and grind the same to a powder rather than grinding an elaborately grown crystal back to powder form.

Figure 1:
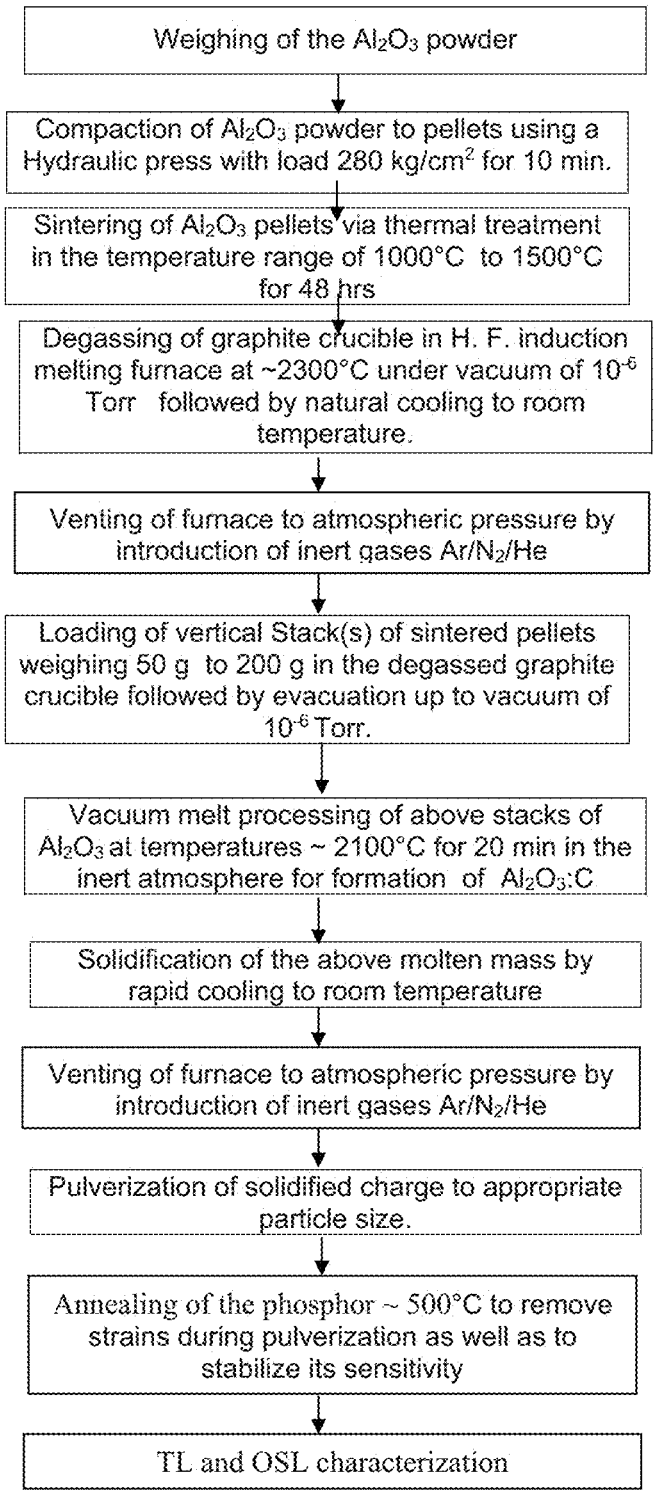
FIG. 1 is the schematic illustration of the process flow of a preferred process embodiment for the synthesis of dosimetric grade $Al_2O_3$:C from the readily available $Al_2O_3$ powder in accordance with the present invention.

The accompanying FIG. 1 is a schematic illustration of the stages involved in the said large scale production of the dosimetric grade polycrystalline $Al_2O_3$:C in accordance with the present invention. As shown in said figure, the basic steps involved in such process of synthesis of dosimetric grade polycrystalline $Al_2O_3$:C comprises of fabrication of pellet from high purity alumina powder or mixed with desired dopant in the concentration in the preferred range between 0.01 wt %-0.5 wt % followed by the sintering of the fabricated pellets to facilitate the subsequent melt processing of these pellets in vacuum, wherein sintered pellets are vacuum melted in graphite environment or enclosure preferably in a suitably degassed graphite crucible. After the completion of the melting process, the molten charge is solidified by rapid cooling and then solidified mass is pulverized to powder form with appropriate particle size and finally the pulverized mass is annealed to stabilize the sensitivity of the melt processed polycrystalline $Al_2O_3$:C.

It is well known from the present knowledge, that for a material to be dosimetrically sensitive, it must have a homogeneously distributed 'traps' and 'recombination centers'. In the present invention the process parameters relating to the aforesaid process flow including process temperature, retention time, cooling rates or/and the parameters involve in the degassing of the graphite crucible are properly optimised to achieve sufficient concentration and adequate distribution of dosimetrically relevant defects in the melt processed material such as polycrystalline $Al_2O_3$:C.

As will be apparent that the advantages of the present invention resides in the use of sintered pellets having increased density over a mere mixture of powders which allows the capability of using a smaller crucible for producing the polycrystalline mass of same size that can be achieved with starting materials in powdered form. Further, the sintered pellets tend to contract in size without sticking to the crucible thereby allowing for easy removal of the pellets and enabling re-use of the crucible for subsequent processing of additional charge. The melt processing of $Al_2O_3$ is performed at the temperature around its melting point. Preferably the processing is done at about 2050° C. for periods ranging from 10 to 30 minutes. For growth of polycrystalline $Al_2O_3$ with oxygen vacancy defects, processing is done in a highly reducing atmosphere in the presence of graphite with the purpose of obtaining low partial pressure of oxygen.

Degassing of the graphite crucible is a crucial step of the present invention. A sufficiently degassed crucible ensures that high level vacuum is attained in the processed chamber so that induction of oxygen related vacancy defects becomes possible. Incomplete degassing of the graphite crucible would lead to inhibition of formation of desired concentration of oxygen related defects due to diffusion of gases released by crucible in to alumina host at high temperatures necessary for melting of alumina.

In the present invention carbon produces oxygen vacancies in $Al_2O_3$. An oxygen vacancy defect may be a single oxygen vacancy defect, a double oxygen defect, a triple oxygen vacancy defect, or a more than triple oxygen vacancy defect. An oxygen vacancy defect may be associated with one or more impurity atoms or may be associated with an interstitial intrinsic defect such as misplaced interstitial oxygen atoms. Occupancy of an oxygen vacancy by two electrons gives rise to a neutral F− center, whereas occupancy of any oxygen vacancy by one electron forms an $F^+$ center which has a positive charge, with respect to the lattice.

In the present invention, high frequency induction heater and coil is preferred to melt the sintered pellets in the graphite crucible but in the H.F. induction heater and coil may be replaced by other heating methodology such as spark plasma sintering or laser which is capable of providing enough localized heat to form the molten zone. Further it should be noted that melting of the sintered pellets by using a beam of electrons emanating from an electron gun is not preferred since the melting due to such a beam is highly localized, the quantity of the pellets that such a beam can possibly melt is highly restricted (~few mg).

In a preferred process embodiment of the present invention, during the vacuum melt processing of the sintered pellets in the process chamber partial introduction of inert gas like argon is preferred as it is found to be process friendly for yielding large number of dosimetric grade $Al_2O_3$:C batches of similar sensitivity on a sustained basis.

The present invention is basically directed to provide a economical method which is adapted to produce dosimetric grade $Al_2O_3$:C on a large scale without involving any costly apparatus or technical setup. By this invention, production of $Al_2O_3$ has been achieved in a preferred process embodiment at the scale of 200 g without taking recourse to the widely practiced yet technologically complicated route of crystal growth for applications including but not restricted to radiation dosimetry.

The details of the invention, its objects and advantages are explained hereunder in greater detail in relation to the following non-limiting example:

EXAMPLE

The method of producing dosimetric grade polycrystalline $Al_2O_3$:C by using alumina powder as described in the present invention was carried out to realize the large scale production of luminescent material having pre-existing luminescence centers for uses, including but not limited to personnel dosimeters, environmental dosimeters and high dose dosimeters through optically stimulated luminescence. The non limiting process flow as presented in the present example shows the involvement of different process parameters for said production of the dosimetric grade polycrystalline $Al_2O_3$:C.

Step 1: Highly pure alumina is mixed with desired dopant in the concentrations in the range 0.01 wt %-0.5 wt % by means of a Planetary Ball-mill.

Figure 2A:
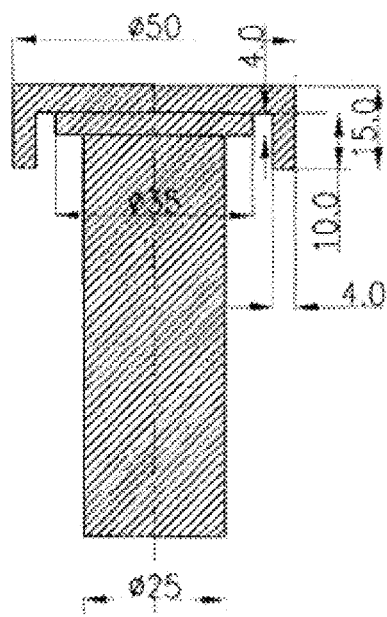
FIG. 2A shows the plunger design of a preferred DIE for making $Al_2O_3$ pellets according to the present invention.
Figure 2B:
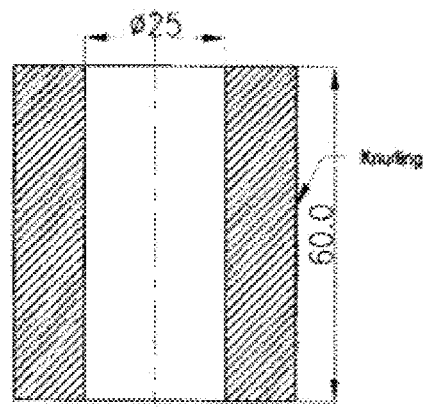
FIG. 2B shows the body of the preferred DIE for making $Al_2O_3$ pellets according to the present invention.
Figure 2C:
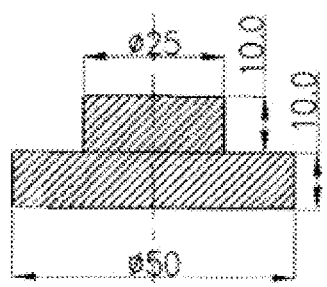
FIG. 2C shows the base of the preferred DIE for making $Al_2O_3$ pellets according to the present invention.

Step 2: The mixture as prepared in step 1 without addition of binder, is placed in a powder compactor having a diameter about 25 mm (FIG. 2A, FIG. 2B and FIG. 2C) and then is subjected to a load in the range 50-280 kg/cm$^2$ for durations of 5-25 min by using a Hydraulic Press adapted to transform the mixture into pellets form.

Step 3: The pellets fabricated in step 2 are placed on an alumina pedestal in a resistively heated furnace and were subjected to thermal treatment in the temperature range of 1000-1500° C. for durations 1-50 hrs using heating and cooling rates in the range 60° C./hr to 400° C./hr in the ambient of $N_2$ or Ar or normal atmosphere. This sintering facilitates the subsequent melt processing of these pellets in vacuum. The specific type of furnace used to sinter the pellets is not significant.

Figure 3A:
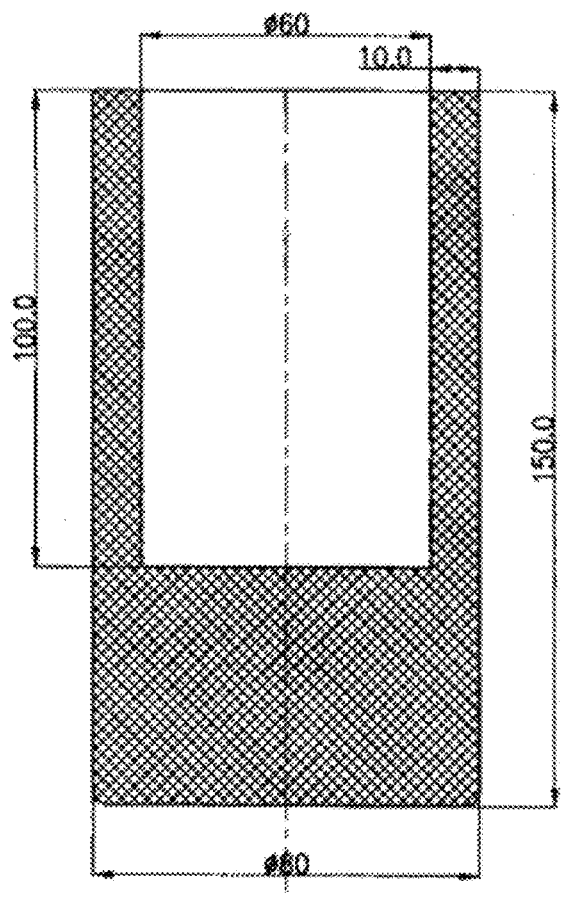
FIG. 3A illustrates a side view of the graphite crucible for melt processing of $Al_2O_3$ pellets according to the present invention.
Figure 3B:
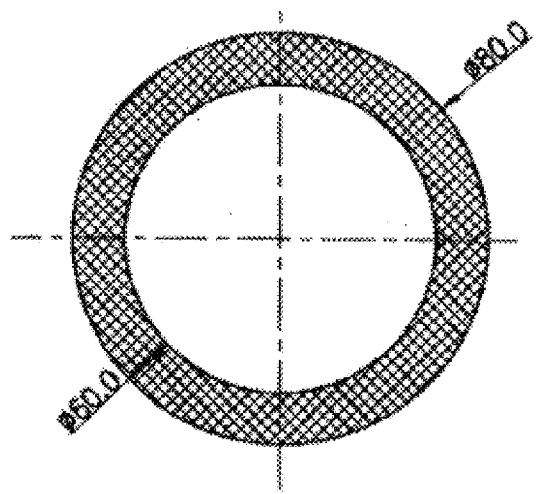
FIG. 3B illustrates a top view of the graphite crucible for melt processing of $Al_2O_3$ pellets according to the present invention.
Figure 4:
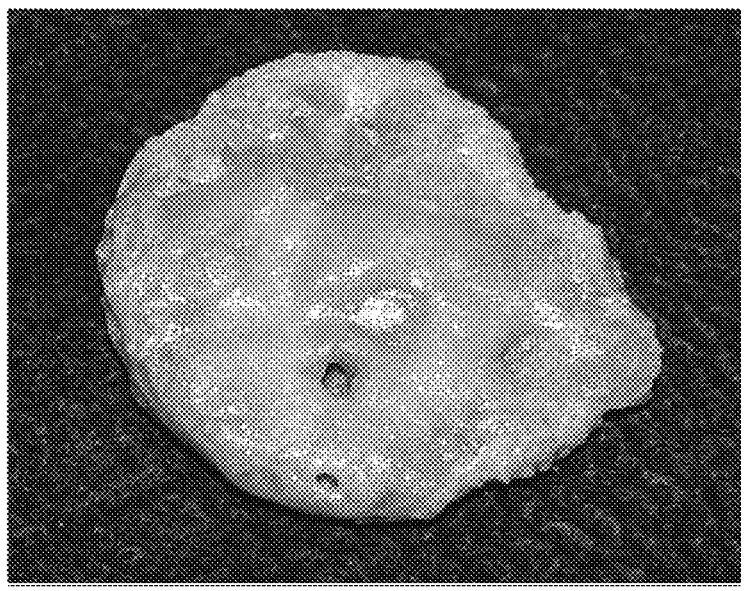
FIG. 4 shows a typical melt processed polycrystalline $Al_2O_3$:C charge.

Step 4: the sintered pellets obtained in step 3 is vacuum melted in a graphite crucible having dimensions (height: 150 mm, inner diameter: 60 mm, outer diameter: 80 mm and depth: 100 mm), (FIG. 3A and 3B) whose outer surface is wrapped with a graphite blanket as a liner, which is introduced into a commercially available inductively heated melting furnace operating at the base pressure of $10^{-7}$ Torr. This furnace is equipped with turbo-molecular pump and a combination of Roots and rotary pump. This furnace is capable of attaining temperature 2500° C. and has got melting capacity 500 g. The volume of the melting chamber admeasures 60×80×60 cm$^3$ and the furnace is energized by a power supply with nominal wattage of 15 kW operating at 9600 Hz. After a base ~$10^{-6}$ Torr is attained, the furnace along with the crucible described above is heated to temperatures 1800° C.-2100° C. for duration of ~30 min for degassing purposes. The furnace is subsequently cooled to the room temperature and is returned to the atmospheric pressure through introduction of a high purity inert gas e.g. Ar.

The sintered pellets weighing in the range of 50-200 g are vertically stacked in the degassed crucible and a base pressure of ~$10^{-6}$ Torr is attained once again. The furnace is heated to 1600° C. and then further heated to the temperatures in the range 1600-2100° C. within a period of ~20 min. The duration at highest temperature was typically kept ~10 minutes to ensure complete melting of the charge. After this, the furnace was cooled to 1000° C. over a period of 20-180 min and then to room temperature over a period of ~5 hrs. After reaching to the room temperature furnace is vented to atmospheric pressure by introduction of inert gases Ar/$N_2$/He. The furnace is energized by a power supply with nominal wattage of 15 kW operating at 9600 Hz.

Figure 5:
FIG. 5 shows the melt processed polycrystalline $Al_2O_3$:C after pulverization.

Step 5: The molten charge obtained in step 4 was pulverized to a powder of particle size in the range 37 to 105 μm as shown in FIG. 5. This powder was subjected to a stabilizing annealing treatment at 500-900° C. for duration of about 30 minutes to remove strains during pulverization as well as to stabilize its sensitivity.

Figure 6:
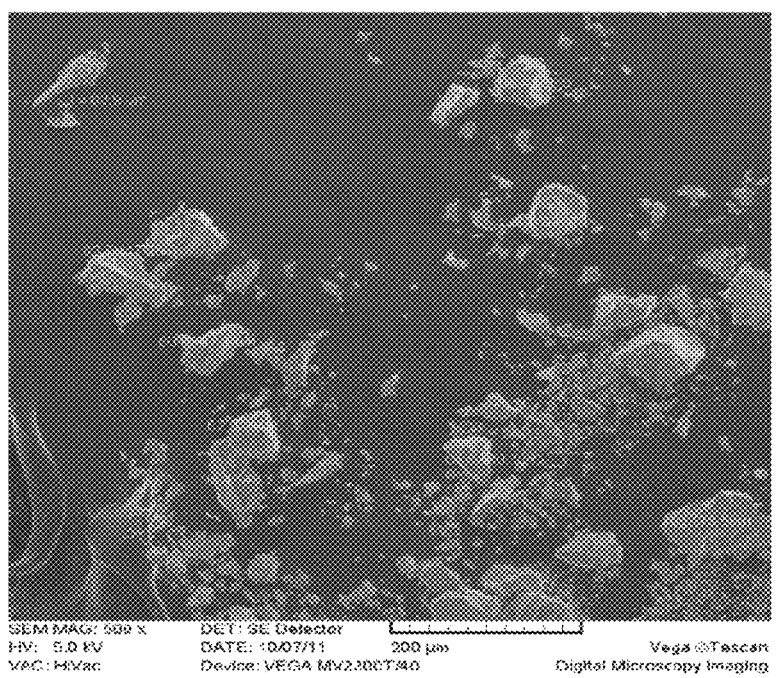
FIG. 6 shows a SEM image of melt-processed polycrystalline $Al_2O_3$:C after pulverization.
Figure 7:
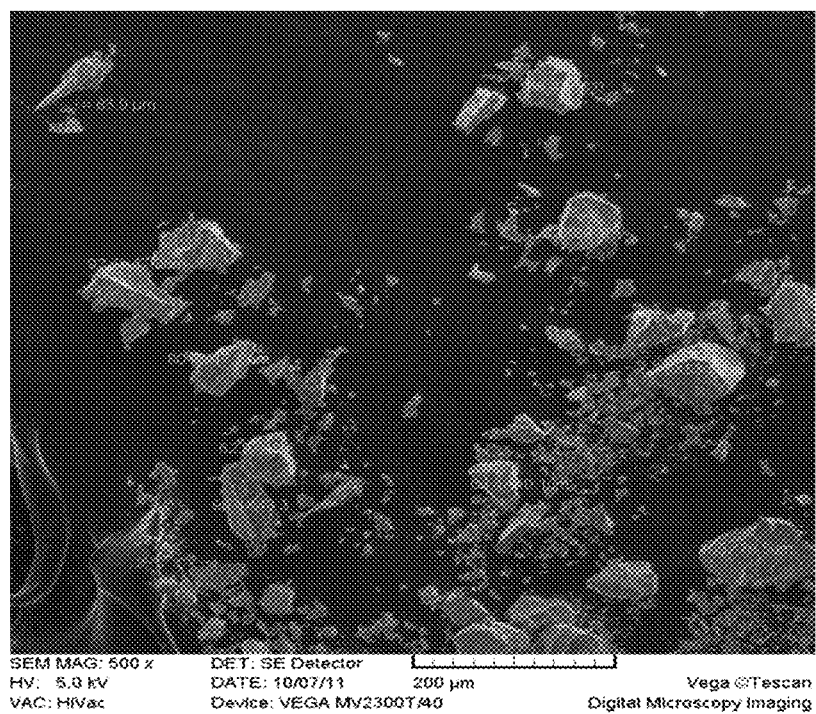
FIG. 7 shows the grain size dependence of OSL sensitivity in $Al_2O_3$:C synthesized using melt processing technique.
Figure 8:
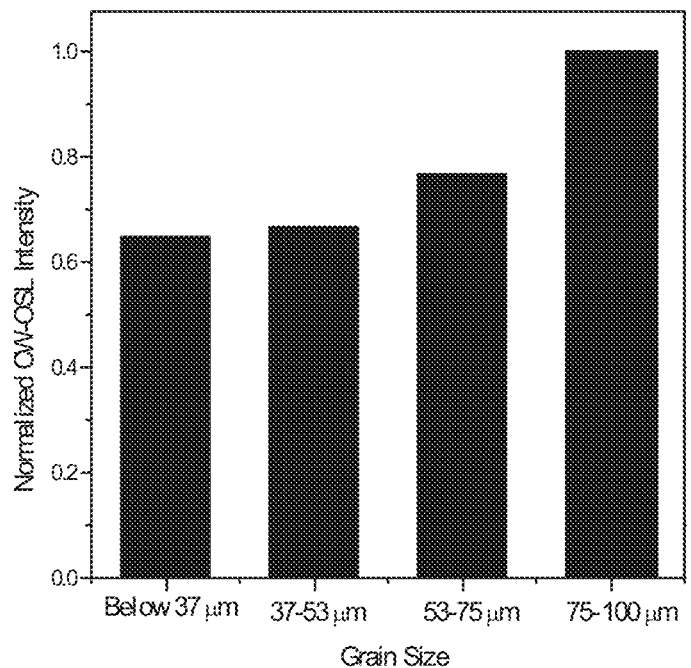
FIG. 8 illustrates the sensitivity variation in the melt processed $Al_2O_3$:C material.
Figure 9:
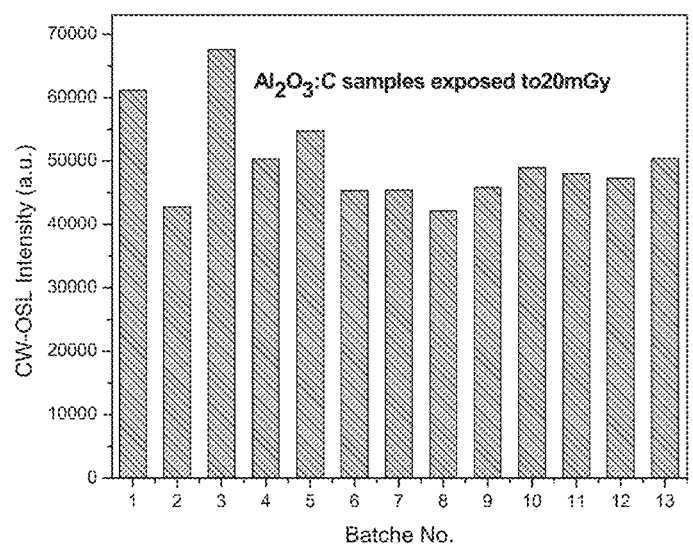
FIG. 9 shows the OSL fading in $Al_2O_3$:C synthesized using melt processing technique.
Figure 10:
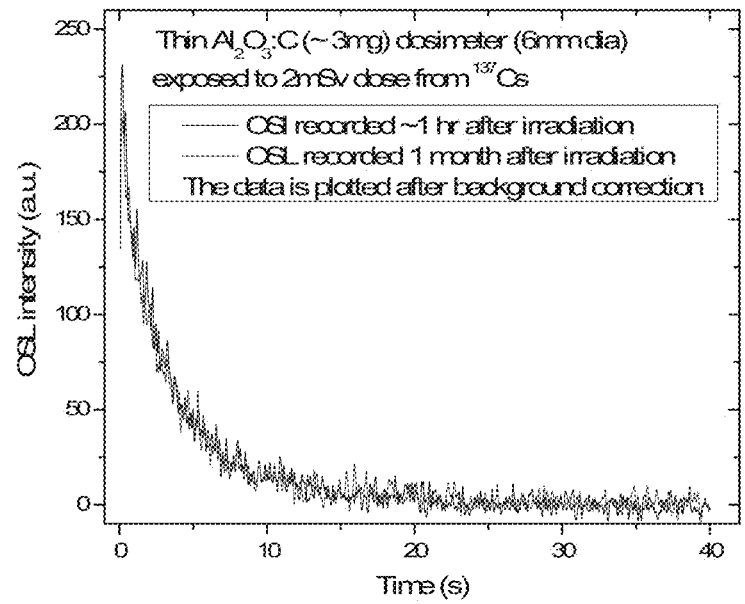
FIG. 10 shows the OSL dose response in $Al_2O_3$:C synthesized using melt processing technique.
Figure 11:
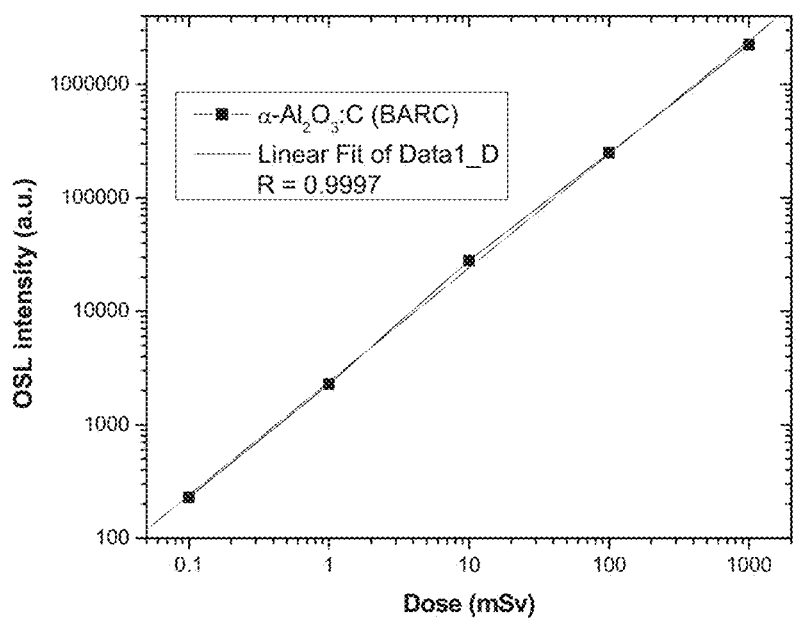

FIG. 6 shows a scanning electron microscope (SEM) image of the melt-processed polycrystalline $Al_2O_3$:C obtained after said pulverization process.

Dosimetric grade polycrystalline $Al_2O_3$:C synthesized by following the process as disclosed in the aforesaid exemplary process embodiment is further investigated to characterize the dosimetric performance of the polycrystalline $Al_2O_3$:C and accompanying FIGS. 7-10 shows the variation of different parameters relating to the characterization of the material obtained from the said process.

The said characterization of the dosimetric grade polycrystalline material obtained from the said process clearly confirmed the desired OSL sensitivity of the polycrystalline material including having grain size in the range 37-100 μm which are compatible with the OSL sensitivity of same dosimetric grade polycrystalline material processed through time consuming and expensive traditional crystal growth mode of synthesis. Furthermore, CW-OSL intensity over different processing batches as disclosed in the FIG. 8 clearly indicates consistency of the present cost effective synthesis process to achieve uniformity in the distribution of radiation defects in the processed material.

We claim:

1. A method for the synthesis of polycrystalline mass of ceramic materials with dopant C comprising:
    involving source ceramic material $Al_2O_3$ in its readily available powder form, to provide large scale synthesis of polycrystalline $Al_2O_3$:C of optically stimulated luminescence grade;
    said large scale synthesis of the polycrystalline $Al_2O_3$ includes:
    compaction of said $Al_2O_3$ powder to pellets;
    sintering of the $Al_2O_3$ pellets via thermal treatment;
    degassing of a graphite crucible in a melting furnace by heating to temperatures 1800° C.-2100° C. under vacuum of 500 mTorr to $10^{-4}$ Torr followed by natural cooling to room temperature;
    venting the furnace to atmospheric pressure by introduction of inert gases;
    loading of vertical stacks of sintered pellets preferably weighing in the range of 50-200 g in the degassed graphite crucible followed by evacuation up to vacuum of $10^{-4}$ to $10^{-6}$ Torr;
    subjecting the stacks to vacuum melt processing at temperatures around its melting point in inert atmosphere for formation of the $Al_2O_3$:C;
    solidification of the above molten mass by rapid cooling to room temperature and venting of the furnace to atmospheric pressure by introduction of inert gases;
    pulverization of the solidified charge to appropriate particle size; and
    annealing of the pulverized powder to remove strains during pulverization as well as to stabilize its sensitivity.

2. The method of claim 1, wherein the pellets are sintered in a resistively heated furnace and subjected to thermal treatment in the temperature range of 1000-1500° C. for durations 1-50 hrs using heating and cooling rates in the range 60° C./hr to 400° C./hr in the ambient of $N_2$ or Ar or normal atmosphere.

3. The method of claim 1, wherein the sintered pellets weighing in the range of 50-200 g and vertically stacked in the degassed graphite crucible are melt processed at temperature around their melting point wherein the degassed graphite crucible acts as a source of carbon doping, the processing is done at about 1600-2100° C. for periods ranging from 10 to 30 minutes and for growth of polycrystalline $Al_2O_3$:C with oxygen vacancy defects, processing is done in a highly reducing atmosphere in the presence of graphite with the purpose of obtaining low partial pressure of oxygen.

4. The method of claim 1 wherein the rapid cooling of the melted mass is performed by cooling the mass to 1000° C. over a period of 20-180 min and then to room temperature over a period of about 5 hours.

5. The method of claim 1 wherein heating methodology used for melting the sintered pellet is adapted to provide localized heat to form the molten zone sufficient enough to accomplish the said large scale production.

6. The method of claim 1 wherein the graphite crucible is degassed before executing the melting operation inside the crucible to ensure the presence of high level vacuum, preferably in the range of $10^{-6}$ torr, is attained in a melting zone so that induction of oxygen related vacancy defects becomes possible.

7. The method of claim 1, wherein solidified mass pulverized to a powder of particle size preferably in the range 37 to 105 μm and powder was subjected to a stabilizing annealing treatment at 500-900° C. for duration of about 30 minutes.

8. The method of claim 1 wherein the source ceramic material may further include Yttrium Aluminum Garnet (YAG).

* * * * *